B. SIML.
DENTAL AMALGAM OR ALLOY MIXER.
APPLICATION FILED JULY 23, 1921.
1,396,537.
Patented Nov. 8, 1921.
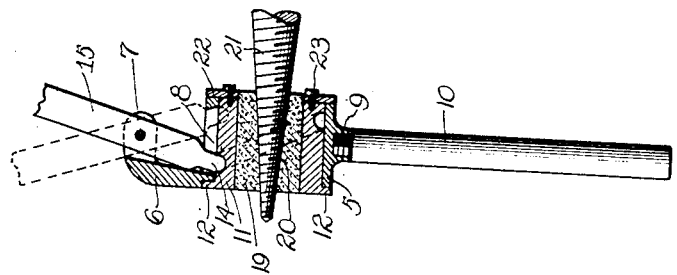
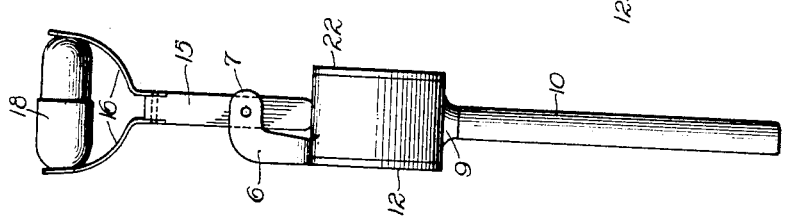
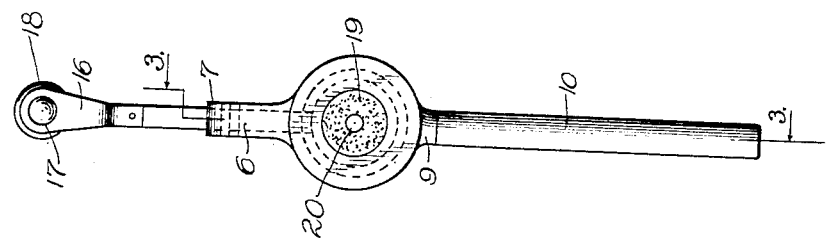
Witness
Arthur C. Wright
Inventor
Bohuslav Siml
By Chas. C. Tillman
Attorney

UNITED STATES PATENT OFFICE.

BOHUSLAV SIML, OF CHICAGO, ILLINOIS.

DENTAL AMALGAM OR ALLOY MIXER.

1,396,537.

Specification of Letters Patent.   Patented Nov. 8, 1921.

Application filed July 23, 1921. Serial No. 487,051.

*To all whom it may concern:*

Be it known that I, BOHUSLAV SIML, a citizen of the United States, residing at Chicago, in the county of Cook and State of Illinois, have invented certain new and useful Improvements in Dental Amalgam or Alloy Mixers, of which the following is the specification.

This invention relates to improvements in agitating or mixing devices, and particularly that type of such devices which are intended for use by dentists, in connection with the chucks of dental lathes or other suitable, rotatable shafts or spindles for thoroughly, quickly and efficiently mixing the ingredients of dental amalgam or alloy.

The principal object of my present invention is to furnish a mixer for the ingredients of amalgam, alloy and the like which shall be extremely simple and inexpensive in construction, attractive in appearance, strong, durable and efficient in operation, with its parts so made and arranged that it can be easily handled and quickly applied to or removed from the chuck of a lathe or other suitable, rotatable member employed for imparting motion to the parts of the device.

In the accompanying drawing which serves to illustrate an embodiment of the invention—

Figure 1 is a face view of the device,

Fig. 2 is a side view thereof,

Fig. 3 is a central, vertical sectional view taken on line 3, 3 of Fig. 1, looking in the direction indicated by the arrows, and Fig. 4 is a detached view in side elevation of the rotary body of the device.

Corresponding numerals of reference designate like parts throughout the different views of the drawing.

Reference numeral 5 designates the frame of the implement, which frame is cylindrical in shape and has radially extended from its periphery an arm 6, which is provided at its outer end with a forked extension 7, which extension overhangs the frame 5, as will be clearly understood by reference to Fig. 3 of the drawing. In this view it will be noted that the frame 5 is provided with a slot 8, which is located in the same direction as that of the prongs of the extension 7 of said arm.

Diametrically opposite of the arm 6, the frame 5 is provided with a screw threaded socket 9 for the reception of a threaded end of a handle 10, employed for holding and manipulating the device. Rotatably mounted in the frame 5 is a cylindrical body 11 which has at one of its ends an external annular flange 12, which co-acts with the adjacent end of the frame. This body is provided with a diagonal and endless groove 13 for the reception and operation of the reduced end 14 of lever 15, which is pivotally secured to the prongs of the forked extension 7 of the arm 6. The upper or free end of the lever 15 is provided with a pair of spaced and outwardly curved resilient clamping members 16, each of which is by preference provided with a circular opening 17 near its free end for the reception of the ends of a container 18 for the ingredients of the amalgam or alloy, which container is by preference in the form of a capsule, such as those used for holding and administering medicines of various kinds.

Located in the cavity of the body 11, so as to rotate therewith is a filler 19 of felt, or other suitable material, which is provided centrally with an opening 20 for the reception of a portion of a chuck 21 of a dental lathe, or for the reception of any other suitable, rotatable spindle or shaft. That end of the body 11 opposite its flange 12 has secured thereon a centrally orificed plate 22 which surrounds a portion of the filler 19 and may be secured to the body by means of screws 23, or otherwise.

From the foregoing and by reference to the drawing it will be readily understood and clearly seen that by grasping the handle 10, the opening 20 within the filler 19 of the device can be so placed as to easily insert the tapered chuck 21 thereinto, in such a manner that the filler 19 will closely bind on, or grip the chuck so as to rotate therewith. In this operation it is manifest that the body 11 will be rapidly rotated and as one end of the lever 15 engages the groove 13 of the body, it is manifest that the lever 15 which carries the container 18 will be rapidly vibrated, thus causing the ingredients held by the container to be quickly and thoroughly mixed.

Having thus fully described my invention, what I claim as new and desire to secure by Letters-Patent is—

1. The combination with a cylindrical frame having a radially extended arm provided with a forked extension over-hanging the frame, said frame having a slot at the base or foot of said arm extended in the direction of the prongs thereof, of a cylindrical body having a diagonally disposed groove in its periphery and rotatably mounted in the frame and provided at one of its ends with an external annular flange to co-act with the adjacent end of the frame, a centrally orificed filling located in the body for rotation therewith, a circular plate having a central opening surrounding a portion of said filling and secured to that end of the body opposite its flange, and a lever pivoted between the prongs of the fork of said arm and engaging at one of its ends the groove of said body and provided at its other end with a pair of spaced clamping members for a container.

2. The combination with a cylindrical frame having a radially extended arm provided with an extension overhanging the frame, said frame having a slot at the base of said arm extended in the direction of said extension, a cylindrical body having a uniformly diagonally disposed groove in its periphery and rotatably mounted in the frame and provided at one of its ends with an external annular flange to co-act with the adjacent end of the frame, a circular plate having a central opening and secured to that end of the body opposite its flange, and a lever fulcrumed on the overhanging extension of said arm and extended at one of its ends through the slot in the frame for engagement with the groove of said body, said lever having at its other end a pair of spaced clamping members for a container.

BOHUSLAV SIML.